United States Patent
Sylvester et al.

(10) Patent No.: US 12,373,570 B2
(45) Date of Patent: Jul. 29, 2025

(54) ARTIFICIAL INTELLIGENCE BASED SECURITY REQUIREMENTS IDENTIFICATION AND TESTING

(71) Applicant: Accenture Global Solutions Limited, Dublin (IE)

(72) Inventors: Chase Alan Sylvester, Prosper, TX (US); Ganesh Devarajan, Hawthorn Woods, IL (US)

(73) Assignee: Accenture Global Solutions Limited, Dublin (IE)

( * ) Notice: Subject to any disclaimer, the term of this patent is extended or adjusted under 35 U.S.C. 154(b) by 308 days.

(21) Appl. No.: 17/876,425

(22) Filed: Jul. 28, 2022

(65) Prior Publication Data
US 2024/0037243 A1  Feb. 1, 2024

(51) Int. Cl.
*G06F 21/57* (2013.01)
*G06F 40/279* (2020.01)

(52) U.S. Cl.
CPC .......... *G06F 21/577* (2013.01); *G06F 40/279* (2020.01); *G06F 2221/033* (2013.01)

(58) Field of Classification Search
CPC ....... H04L 9/50; H04L 9/0618; H04L 9/0643; H04L 63/0435; H04L 9/0825; H04L 63/045; H04L 63/126; G06F 21/53; G06F 21/64; G06F 16/27
USPC .......................................................... 713/176
See application file for complete search history.

(56) References Cited

U.S. PATENT DOCUMENTS

| | | | | |
|---|---|---|---|---|
| 7,191,337 | B2* | 3/2007 | Bartley | H04L 63/102 |
| | | | | 713/168 |
| 9,609,015 | B2* | 3/2017 | Natarajan | H04L 63/145 |
| 9,916,439 | B2* | 3/2018 | Jakubowski | G06F 21/53 |
| 2012/0137138 | A1* | 5/2012 | Gregorovic | G06F 8/61 |
| | | | | 707/694 |
| 2017/0357927 | A1* | 12/2017 | Antonio | G06F 8/30 |

(Continued)

OTHER PUBLICATIONS https://cheatsheetseries.owasp.org/cheatsheets/Unvalidated_Redirects_and_Forwards_Cheat_Sheet.html.
(Continued)

*Primary Examiner* — Jahangir Kabir
(74) *Attorney, Agent, or Firm* — Seed Intellectual Property Law Group LLP

(57) ABSTRACT

The proposed systems and methods apply natural language processing to identify implicit security requirements flowing from input text narratively describing desired features for a software project. These systems and methods can identify hidden security requirements that may not be readily apparent from the features described in the input text. For example, a story may include a feature of a return URL (Uniform Resource Locator), which is the URL for the website to which a user will be redirected. A security vulnerability that would not be obvious from this feature is that a user might be directed to an attacker controlled site instead of the originally intended site. A security requirement that could counteract this vulnerability would be to include the feature of verifying all redirects go to Whitelisted Sites. The proposed systems and methods provide a framework for automated security requirements analysis capable of identifying unstated security requirements early on in a software development lifecycle using artificial intelligence techniques.

20 Claims, 9 Drawing Sheets

(56) References Cited

U.S. PATENT DOCUMENTS

2019/0089723 A1* 3/2019 Valgenti .............. H04L 63/1416

OTHER PUBLICATIONS https://owasp.org/www-project-top-ten/2017/A5_2017-Broken_Access_Control.html#.

Riaz et al., "Hidden in Plain Sight: Automatically Identifying Security Requirements from Natural Language Artifacts"; 2014 IEEE 2nd International Requirements Engineering Conference; Aug. 25-29, 2014; http://www.slankas.net/papers/re14main-hidden-in-plain-sight-preprint.pdf.

El-Hadary et al., "Capturing Security Requirements for Software Systems", Journal of Advanced Research vol. 5, Issue 4, Jul. 2014, pp. 463-472; https://reader.elsevier.com/reader/sd/pii/S2090123214000332?token=9EC42237B6709ED47EDA9231EB9FAA0A54C0388F5E0511C12940276C4189AF1DFBAC1D2B5219024967940D3AEDF2773D&originRegion=us-east-1&originCreation=20230125171841.

Hadavi et al., "Sescurity Requirements Engineering; State of the Art and Research Challenges", Proceedings of the International Multiconference of Engineers and Computer Scientists 2008 vol. I. IMECS 2008, Mar. 19-21, 2008, Hong Kong ; https://www.iaeng.org/publication/IMECS2008/IMECS2008_pp985-990.pdf.

* cited by examiner

ARTIFICIAL INTELLIGENCE BASED SECURITY REQUIREMENTS IDENTIFICATION AND TESTING

TECHNICAL FIELD

The present disclosure generally relates to the field of language processing. More specifically, the present disclosure generally relates to the identification of implicit security requirements flowing from input text narratively describing desired features for a software project.

BACKGROUND

Software development often begins with software project user stories. These user stories can include narrative text that describes the desired features of a software project. In many cases, user stories are written by non-technical team members and are given to software developers to create the code meant to realize the features described in the user story. The user stories tend to focus on the desired features without mentioning or acknowledging security risks the features may invoke. Thus, the software developers are left to determine if any of the features might create security risks. Many times, the security risks are not obvious from the user story and the software developers overlook such security risks, leaving the security risks to be revealed later on in the process of software development or even after deployment or integration of an application. A need exists for finding hidden, unstated security requirements in user stories.

While it is possible to "retrofit" protection into applications post completion, this is the most expensive and least effective approach. Viruses, worms, and other attacks due to security flaws in applications cost businesses billions of dollars in lost productivity, system recovery, and information loss every year.

Unfortunately, security is often an afterthought during project development. Recognizing security requirements early, especially in the development phase, is important so that security problems can be tackled early enough before going further in the process and avoid rework. A more effective approach for security requirement engineering is needed to provide a more systematic way for eliciting adequate security requirements.

There is a need in the art for a system and method that addresses the shortcomings discussed above.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

SUMMARY

Figure 1:
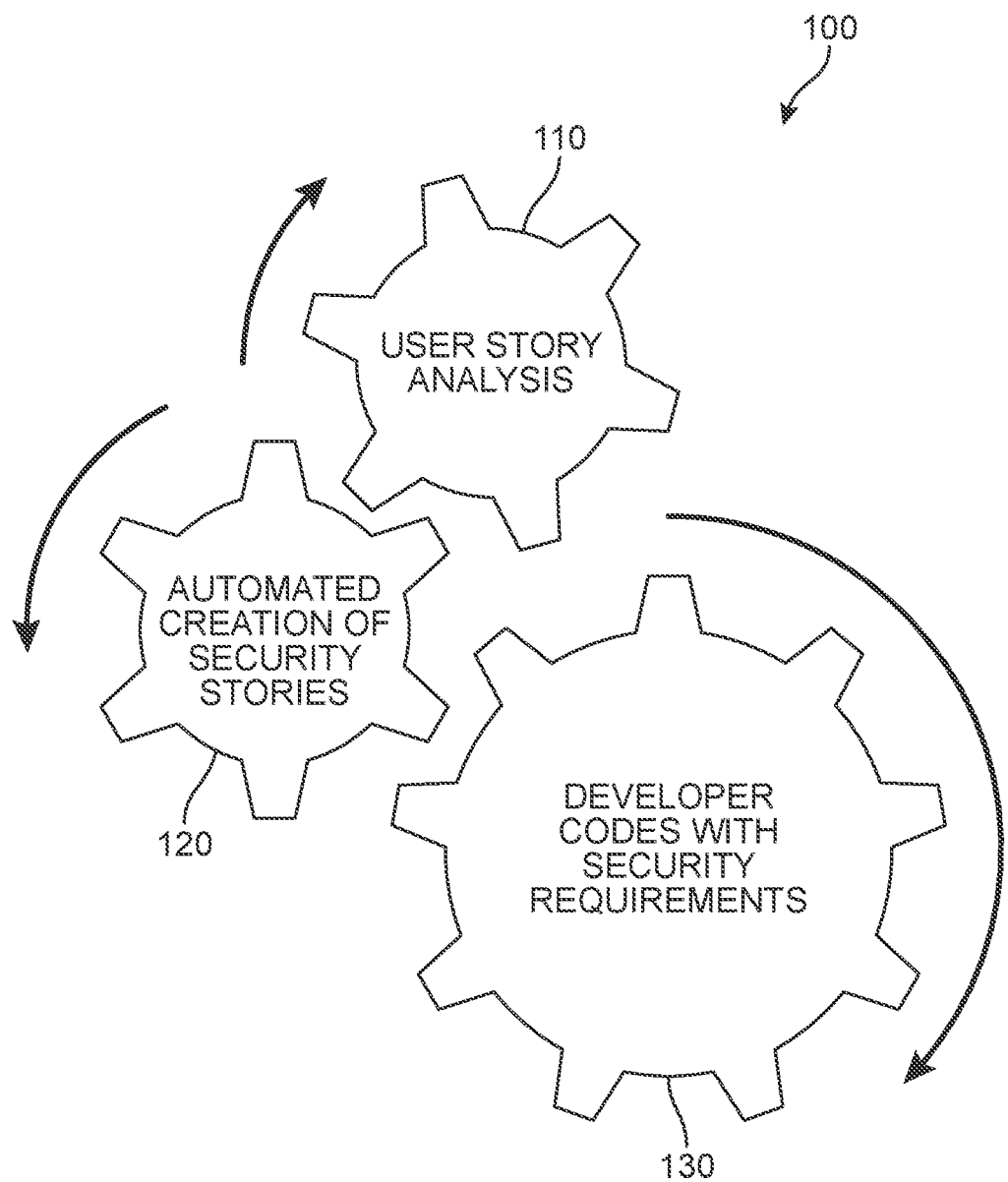
FIG. 1 is a schematic diagram of an overview of a security requirement identification process, according to an embodiment.

Implementations described herein provide for a security requirement identification and tracking system that automatically determines, based on user story data for a project, what security requirements should be linked to each key functional word for a user story. The proposed systems apply natural language processing (NLP) to collect data generated from input text of user stories (and related text) and generate and manage databases that support the operation of the security requirement identification system. A security requirements duplicate dictionary can be provided to improve the output generated for end-user consumption by removal of duplicates of security requirements that would otherwise increase the burden on the end-user to decide which security requirements remain outstanding over time. By reducing duplicates, the security requirements duplicate dictionary can unclutter security requirement reports automatically generated by the proposed systems. These security requirement reports and/or the proposed databases linking security requirements to user stories has a practical application of improving the process of developing code with appropriate security requirements.

The proposed systems can ensure accuracy and completeness in identification of security requirements by the utilization of NLP techniques to parse each word from the user story data, identify those words that represent functional words, and analyze the data one by one as individual words, rather than evaluating sentences or other phrases. In this way, the security requirements that are difficult to immediately recognize based on the project requirements of a story and, therefore, are susceptible to being overlooked, may be quickly identified. For example, a project requirement of creating profiles for users may not call out the need for creating credentials for the profiles. However, creating profiles may inherently invite security issues related to others breaking into the users' profiles. Thus, creating credentials to prevent these break-ins may be a security requirement that naturally follows creating profiles and, thus, should be included in the project requirements. Analyzing full sentences may not reveal such "hidden" security requirements as creating credentials when creating user profiles. The proposed system and methods provide a technical improvement of applying NLP to process and analyze individual words to help reveal these hidden security requirements.

While the disclosed embodiments are based on software project management, it is understood that other project-based systems can benefit from NLP-based detection of security-related issues, as disclosed herein. For example, systems that are being developed to support large-scale operations may benefit from the disclosed techniques, as disclosed herein. In addition, systems for managing and tracking security issues of other types of large, distributed systems with many moving parts or stages of development, can implement embodiments of the security requirement identification system described herein. For example, facilities such as factories, hospitals, manufacturing plants, as well as other facilities with multiple components that rely on each other to perform optimally can be potentially impacted by a wide variety of security issues that can detract from their performance over time. Tracking these issues using the proposed security requirement identification system can (a) ensure security issues are addressed preemptively and efficiently and (b) help the organization appreciate what types of issues are recurring and/or how often they occur, whether the security requirement is a long-term or short-term issue, involves the distribution of resources, inter-personnel communication, or the operation of the devices and hardware supporting the facility, etc. Such knowledge can significantly improve the performance of the facility over the long run, as well as reduce operating costs by fostering proactive interventions during the facility's development.

In different embodiments, the security requirement identification system provides an early warning to developers to incorporate specific mitigating features in the project. Moreover, automation of security requirement identification increases the quality of the project during development, thereby reducing errors relating to a project relative to manual completion of the process.

In one aspect, the disclosure provides computer-implemented method of identifying security requirements during a project development lifecycle. A first step of the method includes retrieving, from a user story data repository and at a first time, user story data for a first user story, and a second step of separating each individual word in the user story data to create a first word list. A third step includes identifying, using NLP, whether each individual word in the first word list is a functional word, and a fourth step includes creating a regex for each individual word identified in the first word list as a functional word to produce a first functional word regex list comprising a first plurality of functional word regexes. The method also includes a fifth step of determining which functional word regexes in the first functional word regex list have one or more corresponding security requirements in a key functional words mapping database, and a sixth step of forming the one or more corresponding security requirements into a first list of security requirements. Furthermore, a seventh step includes linking at least a first security requirement of the first list of security requirements with the first user story in the user stories already assessed database, and an eighth step includes automatically generating and displaying a first report that identifies the first security requirement together with the first user story.

In another aspect, the disclosure provides a non-transitory computer-readable medium storing software comprising instructions executable by one or more computers which, upon such execution, cause the one or more computers to: (1) retrieve, from a user story data repository and at a first time, user story data for a first user story; (2) separate each individual word in the user story data to create a first word list; (3) identify, using NLP, whether each individual word in the first word list is a functional word; (4) create a regex for each individual word identified in the first word list as a functional word to produce a first functional word regex list comprising a first plurality of functional word regexes; (5) determine which functional word regexes in the first functional word regex list have one or more corresponding security requirements in a key functional words mapping database; (6) form the one or more corresponding security requirements into a first list of security requirements; (7) link at least a first security requirement of the first list of security requirements with the first user story in the user stories already assessed database; and (8) automatically generate and display a first report that identifies the first security requirement together with the first user story.

In another aspect, the disclosure provides a system for identification of security requirements. The system comprises one or more computers and one or more storage devices storing instructions that are operable, when executed by the one or more computers, to cause the one or more computers to: (1) retrieve, from a user story data repository and at a first time, user story data for a first user story; (2) separate each individual word in the user story data to create a first word list; (3) identify, using NLP, whether each individual word in the first word list is a functional word; (4) create a regex for each individual word identified in the first word list as a functional word to produce a first functional word regex list comprising a first plurality of functional word regexes; (5) determine which functional word regexes in the first functional word regex list have one or more corresponding security requirements in a key functional words mapping database; (6) form the one or more corresponding security requirements into a first list of security requirements; (7) link at least a first security requirement of the first list of security requirements with the first user story in the user stories already assessed database; and (8) automatically generate and display a first report that identifies the first security requirement together with the first user story.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

DESCRIPTION OF EMBODIMENTS

The proposed systems can apply NLP to collect data generated from input text, utilize mapping database(s) to analyze the data to determine which security requirements apply to the input text, and output a report connecting functional words from the input text with the security requirements. For example, in exemplary embodiments described below, the input text is software development user stories (and other related text) and the security requirements are those related to the user stories. The proposed systems can ensure accuracy and completeness in identification of security requirements by the utilization of NLP techniques to parse each word from the user story data, identify those words that represent functional words, and analyze the data one by one as individual words, rather than evaluating sentences or other phrases. In this way, the security requirements that are difficult to immediately recognize based on the project requirements of a story and, therefore, are susceptible to being overlooked, may be quickly identified. For example, a project requirement of creating profiles for users may not call out the need for creating credentials for the profiles. However, creating profiles may inherently invite security issues related to others breaking into the users' profiles. Thus, creating credentials to prevent these break-ins may be a security requirement that naturally follows creating profiles and, thus, should be included in the project requirements. Analyzing full sentences may not reveal such "hidden" security requirements as creating credentials when creating user profiles. The proposed system and methods provide a technical improvement of applying NLP to process and analyze individual words to help reveal these hidden security requirements.

Secure project development includes integrating security in different phases of the development lifecycle such as requirements, design, implementation and testing. Early consideration for security in requirement phase helps in tackling security problems before further proceeding in the process and in turn avoid rework. In order to integrate security with requirement engineering, security requirements that identify and document requirements needed for developing a secure system can be defined. Security requirements can typically be elicited by analyzing the assets to be protected and the threats from which these assets should be protected. The proposed systems and methods disclose a project security requirement identification that provides a more systematic way for alerting developers to aspects in which security requirements may be inadequate.

As a general matter, the security requirements that will be identified depend on the particular assets of the system, and the threats that can harm such assets. Such threats typically describe what the attacker can do in order to violate the security concerns of the system, and can cause vulnerability in the system. Thus, a vulnerability can refer to a weakness in the system that may be exploited by an attacker. Such threats can cause harm to the system because they violate one or more of its security concerns (confidentiality, integrity, availability, accountability and authenticity).

Security management processes across project disciplines ensure security is properly designed and built into the system that is being developed. Security requirements are usually defined by a security risk assessment, which is a process of identifying business risks, identifying system vulnerabilities or weaknesses that can impact those risks, and recommending mechanisms to control the vulnerabilities. Specific confidentiality, integrity and availability requirements for the new system and the development environment are defined through this process. Security standards, guidelines and procedures provide security direction to the implementation. They will help define how the security requirements developed through the risk assessment must be addressed in all areas of the development environment. They will include security standards for the development environment infrastructure, procedures for the development processes, standards for the design of the security architecture and security guidelines for programming. It is especially important to ensure the security of the development environment because if these systems are broken into and back doors are introduced, it may lead to later compromise of the production system. It will be the responsibility of all developers that these security controls are implemented and adhered to throughout the development process.

With respect to the domain of software development projects, from the standpoint of both cost and effectiveness, considering security as an integral part of the software development lifecycle is the best way to build and maintain robust, reliable, and trustworthy applications. Incorporating security-based techniques in each phase of the software development lifecycle (SDLC) can significantly improve product quality and resistance to attack in the final product.

Although the examples described herein will focus on the use of the proposed security requirement identification approach during the SDLC, it should be understood that a variety of other project development systems, such as systems for managing and tracking maintenance of other types of large, distributed systems with many moving parts or stages of development, can implement embodiments of the security requirement identification tool described herein. Tracking security issues using the proposed security requirement identification tool can (a) ensure issues are addressed efficiently and in a timely fashion and (b) help the organization appreciate what types of issues are recurring and/or how often they occur, whether the issue involves the distribution of resources, inter-personnel communication, or the operation of the devices and hardware supporting the facility, etc. Such knowledge can significantly improve the performance of the facility over the long run, as well as reduce operating costs by fostering proactive interventions.

In general, a requirements analysis is a critical security activity that should be performed early in the SDLC. The requirements analysis brings attention to requirements and how systems interact with their environment to ensure that a software project starts building on the right foundation, as insecurities introduced in this early phase will only be compounded in later phases. In other words, as developers write requirements about what a system must do, they must also consider what a system must not do. When they write use cases, they should also produce misuse/abuse cases to describe how a malicious user might interact with the system. Requirements analysis also leads to a greater understanding and appreciation of risk, such as the business risk of a successful attack against the application, how that event may affect users and what business processes would be necessary to manage damage control. The costs of liability, redevelopment, and damage to brand image and market share is part of this process.

As will be described in greater detail below, the proposed embodiments are configured to assist project developers in identifying security requirements in a more systematic way during the requirement engineering process. Security requirements are used to provide a clear set of security specific needs and expected behavior of a system, with the goal of protecting systems assets (data and files) and blocking unauthorized access to the system from intentional attacks to the application software systems and other forms of internet based security. Some examples include attacks such as spam, denial of service, identity theft, viruses, and many other forms of intentional attacks.

Traditionally, requirements have been classified into two major groups: functional and non-functional. Functional requirements are directed to functional aspects of the system that can be directly tested and observed, and are related to issues such as (but not limited to) access control, data integrity, authentication, and wrong password lockouts fall under functional requirements. Non-functional requirements support auditability and uptime, and deal with, for example, constraints, quality, data, standards, regulations, interfaces, performance, reliability, and other implementation requirements. Thus, for purposes of this application, functional words will refer to those words which are related to functional requirements. Some non-limiting examples of functional words could include "API", "password", "login", "mysql", "oracle", "backend", "splunk", "authenticate", "XML", etc. As a general matter, the functional words that will apply will depend on the functional area being developed, as well as the industry to which the project is directed. For example, Web applications have APIs, while Cloud platforms have cloud services—each of these functional areas has its own functional words that can translate to different security requirements. The words can also be unique to each organization depending on how they operate.

The apparatuses, methods, and non-transitory computer readable media disclosed herein may address the aforementioned technical challenges by utilizing artificial intelligence-based NLP techniques to develop and manage databases that will automatically identify security requirements, a process which may expedite project outcomes and may further increase the quality and accuracy of the product. In different embodiments, the security requirements can be generated in English (or other designated language) and are domain-agnostic to enhance application security across industries. In some embodiments, the proposed security requirement identification system is configured to ingest code parsed into a plurality of "functional words" and automatically translate that word into one or more "Security Requirements". In addition, rather than broadly analyze a user story sentence-by-sentence, the proposed security requirement identification system is configured to examine each individual word (including, but not limited to, user story titles, APIs, HTTP Parameters, etc.) to trigger a security requirement, without reliance on machine learning. Instead, the security requirement identification system includes a "Key Functional Words Mapping" database (see FIG. 2) which is automatically built into a dictionary from the database based on a mapping algorithm. Thus, in different embodiments, the security requirement identification system can analyze each word to determine if the functional word is mapped to a security requirement.

In some embodiments, the security requirements are provided to developers as Security Stories, which describe impacting hacker scenarios, include recommendations and mitigations to prevent hacker scenarios, and contain security acceptance criteria. Often, these Security Stories are designed to require only a brief review (typically a few minutes) for developers to appreciate and absorb the security requirement. This information, though minimal, can significantly decrease development time, as the Security Story succinctly reports the pertinent information and proactively provides the developer with the necessary mitigations to prevent attack scenarios before development starts. In contrast, without such stories, the developer is by nature more reactive, and must conduct their own research to understand, evaluate, and handle security risks, which then extends development time and costs.

For purposes of introduction, FIG. 1 depicts a high-level process 100 (or process 100) of continuous and automated security story generation, according to an embodiment. A security story can be identified based on a return URL or functional keyword/phrase, other keyword, or signature, or other parameters that are associated with risk for the project, whether inadvertently or via a malicious user. The process 100 can be seen to include three broad stages, including a first stage 110 (user story analysis), a second stage 120 (automated creation of security stories), and a third stage 130 (developers empowered to code with security requirements). In the first stage 110, the security requirement identification system receives and processes user stories. In some embodiments, automated API integrations to development tools (e.g., Jira) can be performed and development risk signatures identified (e.g., API, email, PII, etc.). In different embodiments, user story data can provide the system with information on what will be coded. In addition, in some embodiments, the system can include an abuse/hacker case registry that can be used to identify potential security risks.

During the second stage 120, various and multiple hacker scenarios can be generated, and Security Acceptance Criteria defined. In addition, secure code frameworks and mitigation strategies are provided to facilitate development in a tailored process that is designed to reduce false positives. Finally, in the third stage 130, the developer is presented with the identified security requirements. Based on the output of the security requirement identification system, the developer can be cognizant of the security risks that should be addressed before writing code, and is prepared with knowledge of how security will test the issue. The developer can then code securely based on the requirements provided.

For purposes of illustration, two examples of an implementation of the proposed system are described below. In a first example, a first user story (e.g., "User Story 1315") is received by the security requirement identification system. The first user story is associated with the following characteristics:

SUMMARY: Account: TV Common UI redirect to new page
DESCRIPTION: Common UI redirect to new page
ACCEPTANCE CRITERIA: AC1: Create URL for New Stack TV new story
  AC2: If user is eligible for the new page then redirect to the new URL (e.g., URL:https://newurl.com/testing=true&return_url=)

Figure 2:
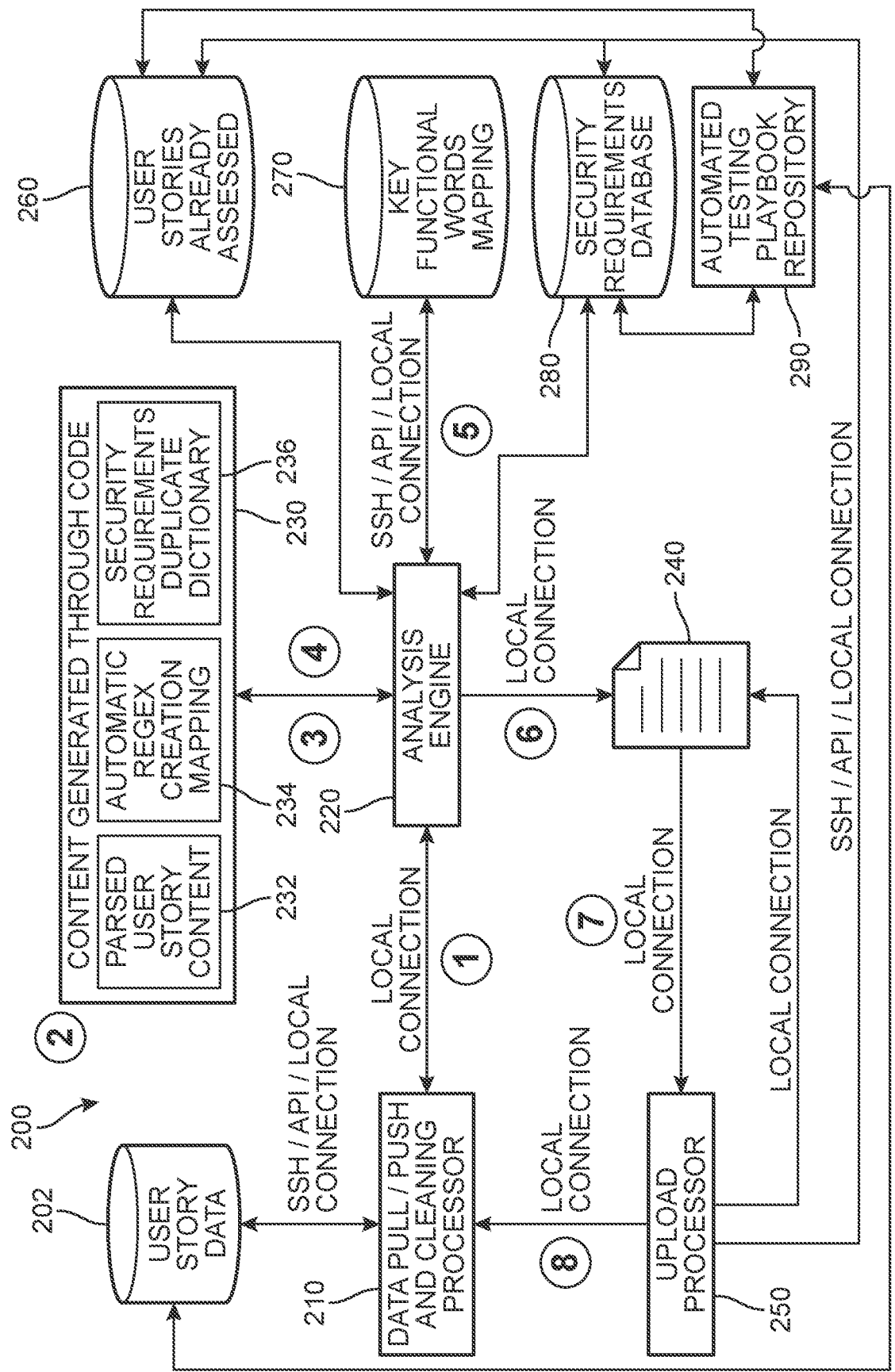
FIG. 2 is a schematic diagram of a security requirement identification system, according to an embodiment.

The security requirement identification system processes this information and generates a Security Story with the following parameters:

SIGNATURES IDENTIFIED: "return_url"
SUMMARY: As an Attacker I would like to use the "return_url" parameter to redirect users to attacker controlled sites
VULNERABILITY TYPE: CWE-601: URL Redirection to Untrusted Site ('Open Redirect')
IMPACT DESCRIPTION: Customers directed to Attacker controlled sites:

a. Account Compromise
b. PII and Customer Data Exfiltrated
c. Ransomware
SECURITY ACCEPTANCE CRITERIA: Verify All Redirects go to Whitelisted Sites
SECURITY REFERENCES: https://cheatsheetseries.owasp.org/cheatsheets/Unvalidated_Redirects_and_Forwards_Cheat_Sheet.html
SECURITY CONTACT: xyz@email.com As a second example, a second user story (e.g., "User Story 116") is received by the security requirement identification system. The second user story is associated with the following characteristics:

SUMMARY: Engineering—Lotus enhance xyz endpoint for contact email update
DESCRIPTION: As an architect I'd like to enhance MS endpoint to support user level contact email update.
ACCEPTANCE CRITERIA: Request param: BAU (email address is already supported) enhance endpoint to use mS for user email update The security requirement identification system processes this information and generates a Security Story with the following parameters:

SIGNATURES IDENTIFIED: "update" and "email"
SUMMARY: As an Attacker I would like to update another user's email address to take over the customer's account
VULNERABILITY TYPE: CWE-284: Improper Access Control
IMPACT DESCRIPTION: Change Customer's Email
a. Account Compromise
b. PII and Customer Data Exfiltrated
SECURITY ACCEPTANCE CRITERIA: Verify Authorization Controls in place to prevent User1 from changing User2's Data
SECURITY REFERENCES: https://owasp.org/www-project-top ten/OWASP_Top_Ten_2017/Top_10-2017_A5-Broken_Access_Control
SECURITY CONTACT: xyz@email.com An overview of an embodiment of a security requirement identification system ("system") 200 is depicted in the diagram of FIG. 2. As shown in FIG. 2, the system 200 can be seen to include multiple modules, components, and repositories or databases, including a push/pull and cleaning processor ("push/pull processor") 210, an analysis engine 220, code-generated content 230, an upload processor 250, a user story data repository 202, a user stories already assessed/processed database 260, a key functional words mapping database 270 (also referred to herein as the database of functional words), a security requirements database 280, and an automated testing playbook repository 290. A high-level walkthrough of the system 200 operation will be provided, with greater details being discussed below with reference to FIGS. 3-10.

For purposes of reference, each step described in FIG. 2 is shown on the diagram by a corresponding numeral. In a first step (1), the system 200 is configured to retrieve user story data. In different embodiments, the push/pull processor 210 of system 200 can establish and/or communicate over an SSH, API, or local connection to the user story data repository 202 and obtain one or more user stories. A local connection can be used, for example, for access to user stories that are already on the system. In one example, the user story data repository 202 can include business functional requirements. The push/pull processor 210 can further clean the received user story data before handing the data off to the analysis engine 220 over a local connection. In some embodiments, each user story can be recognized by its user story Unique Identifier, for example a SHA512 hash of the content or, if provided by the database, a unique identifier normally found in user stories such as the <User Story Application Name>:<Unique User Story Number>.

In a second step (2), the analysis engine 220 parses the user story and extracts and/or generates content (i.e., content generated through code 230) such as parsed user story content 232, automatic Regex creation mapping 234, and entries for a security requirements duplicate dictionary 236. In a third step (3) the analysis engine 220 analyzes the user story data, and in a fourth step (4), the user story data is compared against already created security requirements (with reference to the security requirements duplicate dictionary 236). At a fifth step (5) the analysis engine 220 can assess (e.g., over an SSH, API, or local connection) the user story data based on key functional words to determine security requirements. During this step, the analysis engine 220 access three databases, including the user stories already processed database 260, key functional words mapping database 270, and security requirements database 280, which are each configured to provide data as needed to the analysis engine 220. User stories already processed database 260 can contain user story unique identifiers and the security requirements already associated with the user stories corresponding to the user story unique identifiers. Key functional words mapping database 270 map key functional words to security requirements using the security requirements database. Security requirements database 280 may include security requirements for an application, which may be predetermined by users, such as subject matter experts.

Thus, in some embodiments, the system 200 is configured to identify whether there are user stories for which security requirements have already been created. In some embodiments, each security requirement can be recognized by a Unique Identifier, such as for example a SHA512 hash of the content or, if provided by the database, a unique identifier normally found in security requirements such as the <Security Requirement Topic>:<Unique Security Requirement Number>.

In a sixth step (6), the analysis engine 220 generates a report 240 of security requirements that have been linked to the user stories (e.g., a CSV formatted report and/or a JSON-based output) which can show which sentence triggered a security requirement, and/or the exact user story and/or the specific user story feature one or more security requirements were associated with. In other words, each security requirement can be presented with the item that triggered the identification or selection of that specific security requirement, which can help developers or other project stakeholders better appreciate the context for the security requirement. Over a local connection, the upload processor 250 checks for new security requirements and retrieves data from the report 240 in a seventh step (7). Finally, in an eighth step (8), the upload processor 250 shares the output over a local connection with the push/pull processor 210, which pushes data security requirements to the user stories already assessed database, and can also link the data with appropriate features of the user story. This step ensures the database is updated with a current record of security requirements that have already been assessed for each user story. Such a step is useful as, during project workflows, user stories may change and therefore security requirements may need to be added. In order to streamline the process and produce results that promote efficiency (and reduce redundancy) for the end-user, only the new security requirements can then be outputted.

Furthermore, in some embodiments, as each security requirement is identified, automated testing playbook repository 290 can perform a specialized security quality testing session. This testing would be separate from any standard scanning that may be completed (e.g., DAST, AppScan, SAST, Checkmarx, etc.). Instead, the automated testing playbook repository 290 would comprise one or more 'playbooks' that store data that can be used to implement automated unit testing. In other words, each playbook would serve as a reference for a particular project and allows the developer or other team member to easily access information relevant to the current workflow, and to code the necessary security requirements. In one example, a playbook can include testing sequences, comments regarding each test sequence, custom fuzzing tools, and a method to indicate to the developer if the test passed or failed etc. that can offer a comprehensive automated testing context, and support the performance of security regression testing (e.g., ensuring old/previous security defects are not reintroduced). In some embodiments, the security requirements can include code snippets, secure code frameworks, etc. In some embodiments, the playbook can provide guidance for testing these security requirements. In the case that a test fails in the playbook, the user story may be updated in the user story database. After running the tests, analysis engine 220 can then update the user story database with comments indicating that a test failed (and/or related to why the test failed) and what playbook from the playbook repository was executed that failed. The developer can then pull that playbook that executed and determine why the playbook failed and what changes are needed for their code.

In some embodiments, each playbook in the automated testing playbook repository 290 can be configured to conduct the specialized security quality testing such that each test is customized and unique to each application. For example, a functional area could be based on the security requirement identified, in contrast to standard scans which are not specific to the application and prone to false positives. Thus, in different embodiments, the automated testing playbook repository 290 stores these testing playbooks and, once the developer deploys their code to a testing environment and indicates the user story (from the user story database) as complete, the automated system would pull the corresponding testing playbook(s) associated with the security requirements and execute the security tests reporting the results to development teams. For example, in some embodiments, after completing the work of identifying security requirements, any user stories marked complete by the developer can trigger analysis engine 1118 to pull the testing playbooks and run the tests.

In some embodiments, the system 200 is also configured to perform self-healing actions in response to the output of the automated testing playbook repository 290. As one example, if a critical issue is identified as part of a regression testing portion of the playbook, the system may determine there is a risk for access to an S3 bucket disclosing application secrets. In response, the system will perform self-healing to correct this. Thus, in addressing critical security risks, the automated testing playbooks can be configured with self-healing capabilities, such that the issue, once identified, is automatically and immediately fixed. In the above example of the S3 bucket being disclosed to the internet, the pertinent playbook can be configured to "close off" the bucket from the internet and turn off anonymous access and/or perform any other healing functions based on language that is included in the automated testing playbook.

If the system determines that the issue still persists and/or additional risks remain, then the system can automatically generate an alert to notify an admin. In addition, the system can record the action(s) that were taken to address the issue. If the errors are removed the system can learn that the action(s) taken were correct and should be applied to similar errors in the future. If, however, further errors are detected that impact the code, the system can learn over time to remove these action(s) as a response to the specific error, and monitor and store any action(s) implemented by admins or other entities for repairing the error. These healing action(s) can be added to the repository in the event that the same error is detected in the future.

The system automatically implements these processes to identify security requirements, perform automated security testing upon the completion of developer coding, and automatically repair or correct critical security risks. In different embodiments, the system 200 can automatically create security requirements for specific and unique user data, and link them to the user stories in a final report. In one example, the entire user story and entire security requirement can be presented on one line for improved visibility for developer review.

Figure 3:
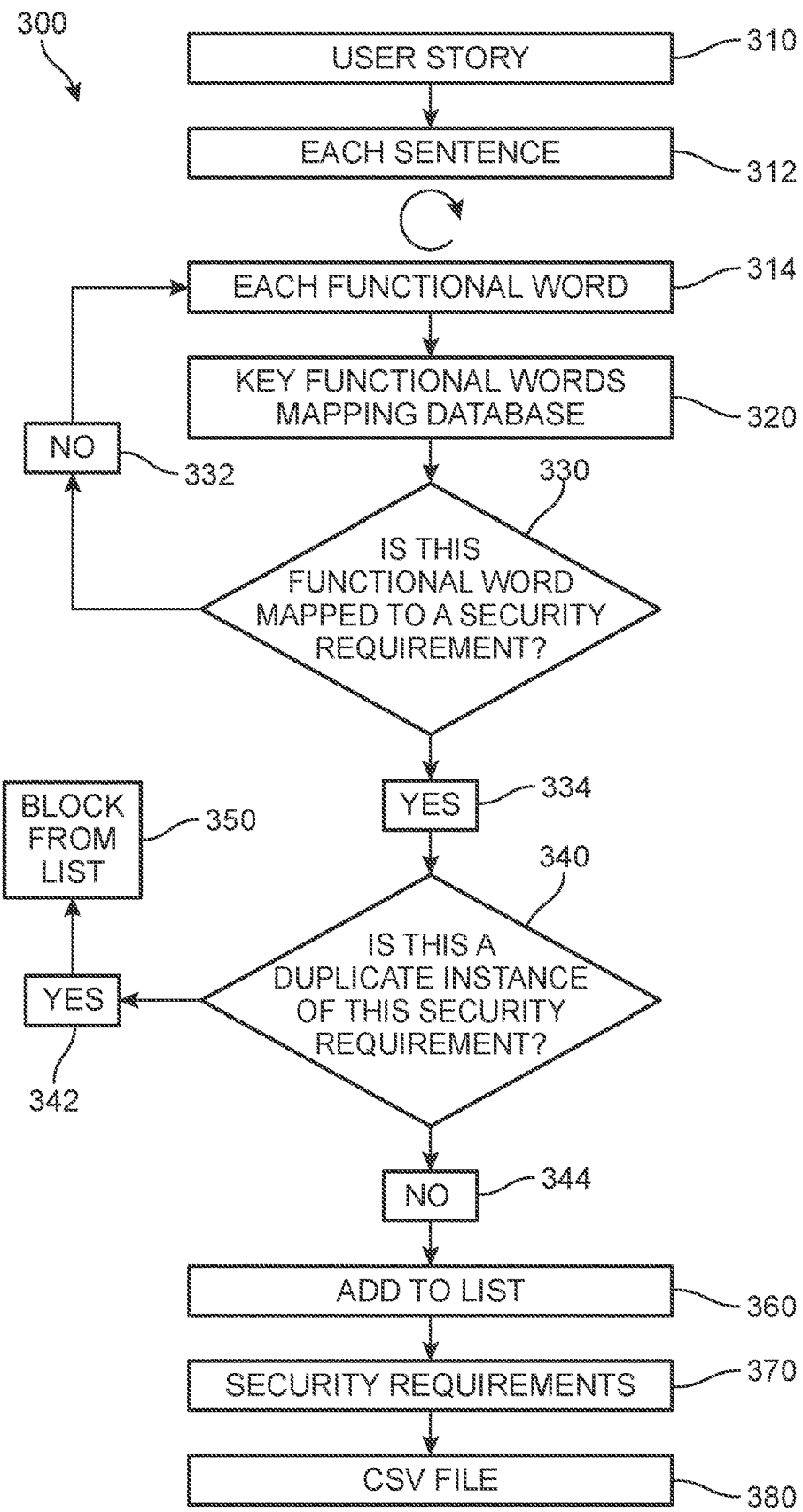
FIG. 3 is a schematic diagram of a process of identifying security requirements during an assessment stage, according to an embodiment.

Additional details regarding the process introduced in FIG. 2 will now be discussed with reference to FIG. 3. In FIG. 3, a flow diagram depicts an embodiment of a process 300 of identifying security requirements during the assessment stage. In a first step, a user story 310 is received by the security requirement identification system. The security requirement identification system, for each sentence 312 in the user story 310, can identify or classify all of the functional words in the sentence using NLP techniques. Each functional word 314 in that respective sentence can be parsed and analyzed. With reference to key functional words mapping database 320, the system can determine whether the given word is mapped to a security requirement at a first query 330. If the determination is "no" 332, the next functional word 314 for that sentence 312 can be similarly evaluated. If there are no more functional words in the given sentence, the next sentence (if any) is similarly processed.

If the determination is "yes" 334, the system can next determine whether the mapped security requirement(s) for this functional word is a duplicate at a second query 340. If the determination is "no" 344, the system can preclude the security requirement from being added to the list (block from list 350). If the system determination is "yes" 342, the identified security requirement for the current functional word can be added to the list 360, and can also be added to security requirements duplicate dictionary 370. Finally, a CSV report or file 380 listing the identified security reports for the given user story can be generated.

Figure 4:
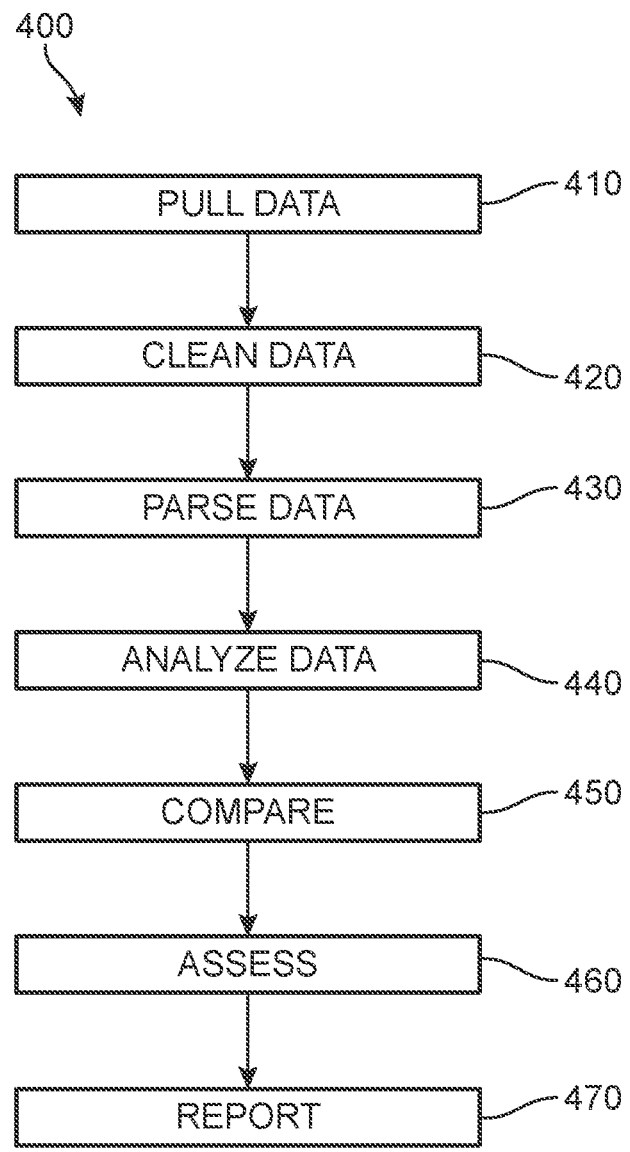
FIG. 4 is a high-level overview of a security requirement identification process, according to an embodiment.

Additional technical details are now provided with reference to FIGS. 4-10. In FIG. 4, a high-level overview of security requirement identification processing steps 400 is shown. In a first phase 410, user story data can be retrieved from the repository. In a second phase 420, the user story data is cleaned and pre-processed in preparation for data parsing, which is performed in a third phase 430. In a fourth phase 440, the parsed data is analyzed, and in a fifth phase 450, the analyzed data is compared to previously identified security requirements. In a sixth phase 460, the key functional words are assessed, and in a seventh phase 470, a report is generated for developer review. Each of these steps will now be discussed in detail in FIGS. 5-10.

Figure 5:
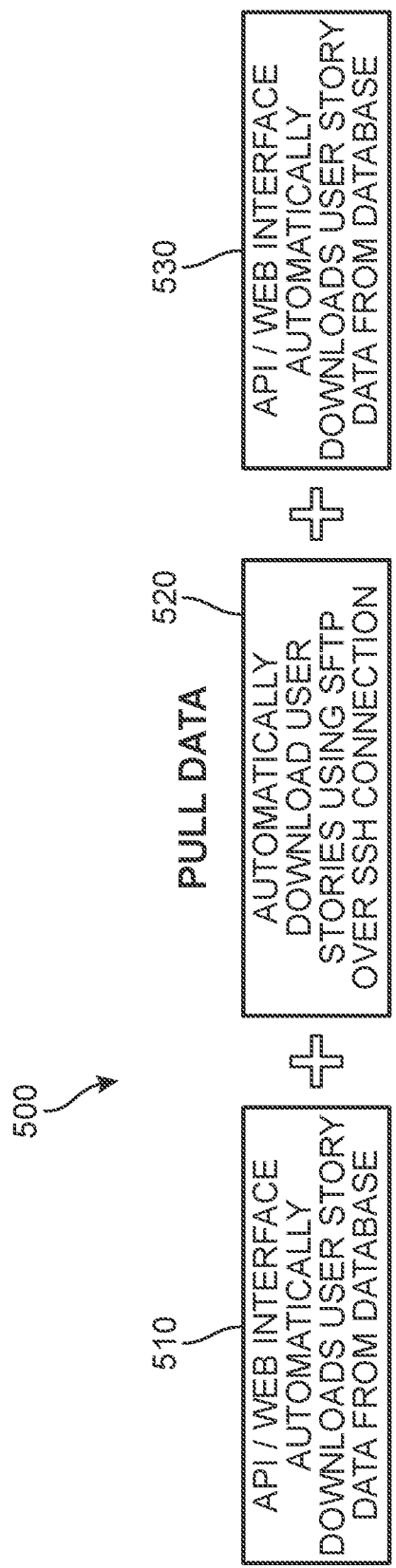
FIG. 5 is a schematic flow diagram presenting a process for retrieving user story data, according to an embodiment.
Figure 6:
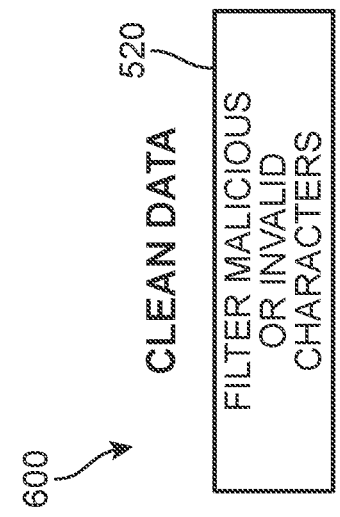
FIG. 6 is a schematic flow diagram presenting a process for cleaning user story data, according to an embodiment.

In FIG. 5, an embodiment of a process for retrieving user story data 500 by the system is presented. In different embodiments, the system can automatically retrieve user story data by utilizing a first connection 510 comprising an API or Web interface to automatically download user story data from a database, a second connection 520 comprising an SSH connection to the system to automatically download user stories using SFTP (Secure File Transfer Protocol), and a third connection 530 comprising a local connection, to a database or file located on the system accessible by the system. In FIG. 6, an embodiment of a process for cleaning user story data 600 by the system is depicted whereby the system is configured to clean the user story data from malicious or invalid characters that can cause errors and false negatives in identifying if a functional word maps to a security requirement. This is performed by the Data Pull/Push and Cleaning Processor as shown in FIG. 2.

Figure 7:
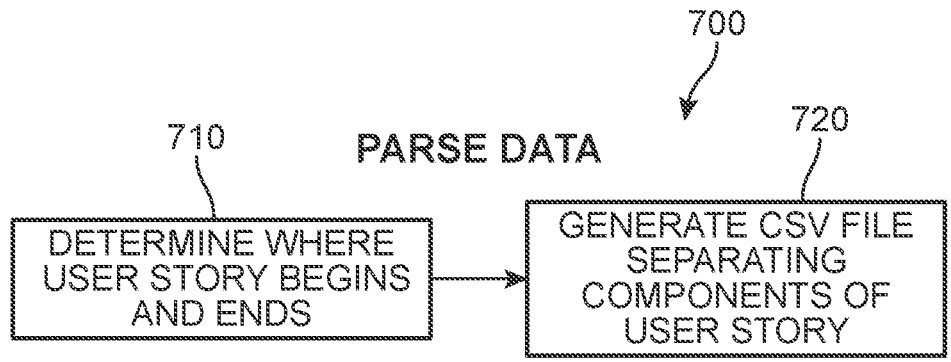
FIG. 7 is a schematic flow diagram presenting a process for parsing user story data, according to an embodiment.
Figure 8:
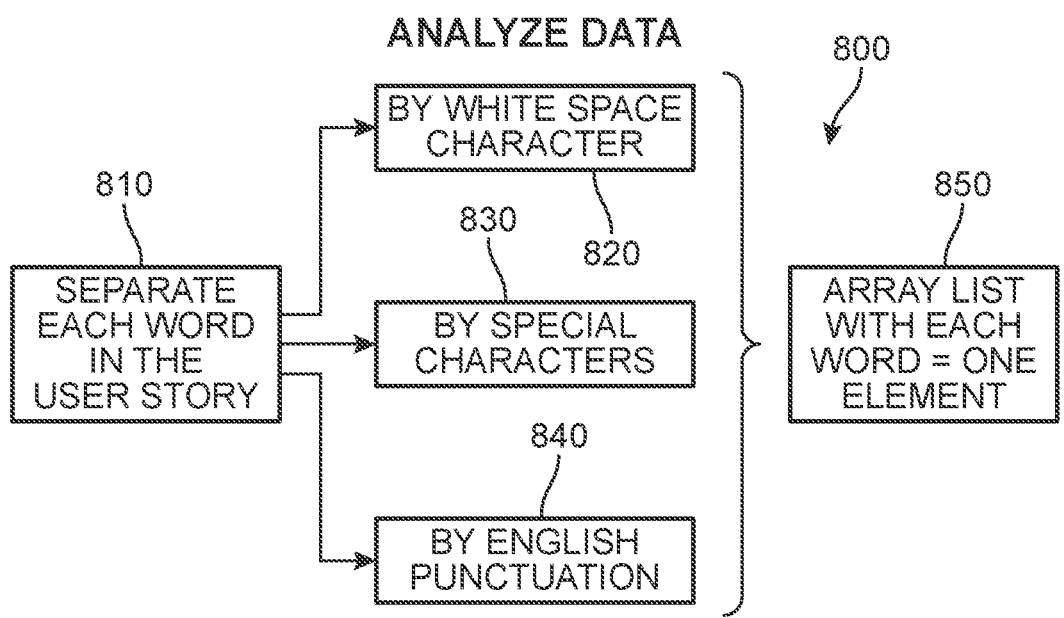
FIG. 8 is a schematic flow diagram presenting a process for analyzing user story data, according to an embodiment.

In FIG. 7, an embodiment of a process for parsing user story data 700 by the system is depicted. In a first step 710, the system receives the user story data and parses it to determine where the user story begins and ends. In a second step 720, a file can be generated automatically (e.g., in CSV format) that separates out the individual components of the user story (for example, User Story Unique Identifier, Title, References, Acceptance Criteria, etc.). In some embodiments, one user story with all its individual components can be represented per line in the file. In FIG. 8, an embodiment of a process for analyzing user story data 800 by the system is shown. During this process, the system can use the newly created file (see FIG. 7) and analyze each user story. For example, in a first step 810, each word in the user story is separated out or extracted. In some embodiments, the separation process for ensuring each word can be analyzed by the "Analyzing Engine", as introduced in FIG. 2. In addition, in different embodiments, the separation process can be based on several features that may occur in the user story data, including white space characters 820, special characters 830, and punctuation 840. Thus, in some embodiments, each word can be separated if there is a white space character, including but not limited to tabs and new line characters (e.g., in Linux® and Windows®), as well as separated if there are special characters including, for example, the following symbols "@#$ % ^&*( )_-+={ }[ ]\|< >/", and also separated based English punctuation including but not limited to the following punctuation: """",.?!:;'~". It can be appreciated that separating each word individually is important to ensure false positives and false negatives are avoided; otherwise, the accurate identification of security risks based on functional words can be diminished. Finally, in a second step 850, the words are entered into a standard array list, with each word representing one element in the array.

Figure 9:
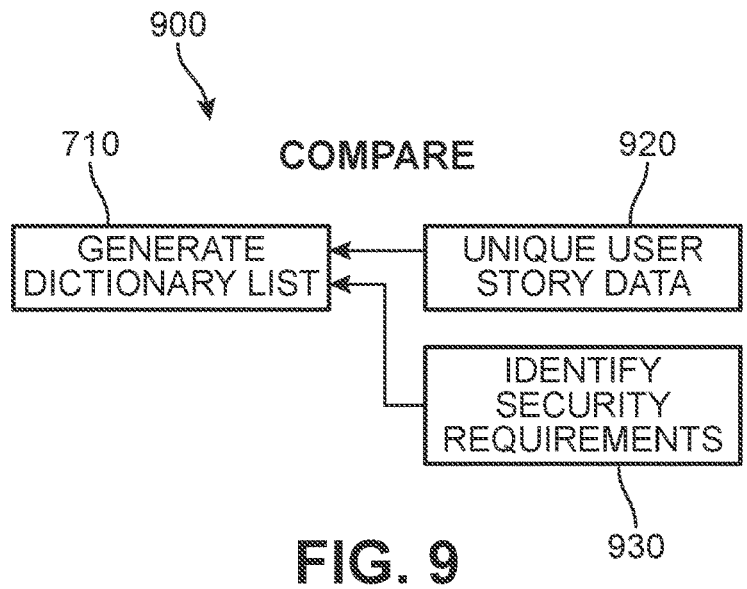
FIG. 9 is a schematic flow diagram presenting a process for comparing functional words, according to an embodiment.

Referring next to FIG. 9, an embodiment of a process for comparing functional words 900 by the system is presented. In different embodiments, the system can compare each functional word against already created security requirements. For example, a dictionary list 910 can be generated using the unique pieces of data 920 from the user story as well as any linked Security Requirements 930 if any that have already been identified. The dictionary list 910 is used by the system in its assessment process to eliminate identifying the same security requirement with a user story, preventing duplicate values from occurring.

Figure 10:
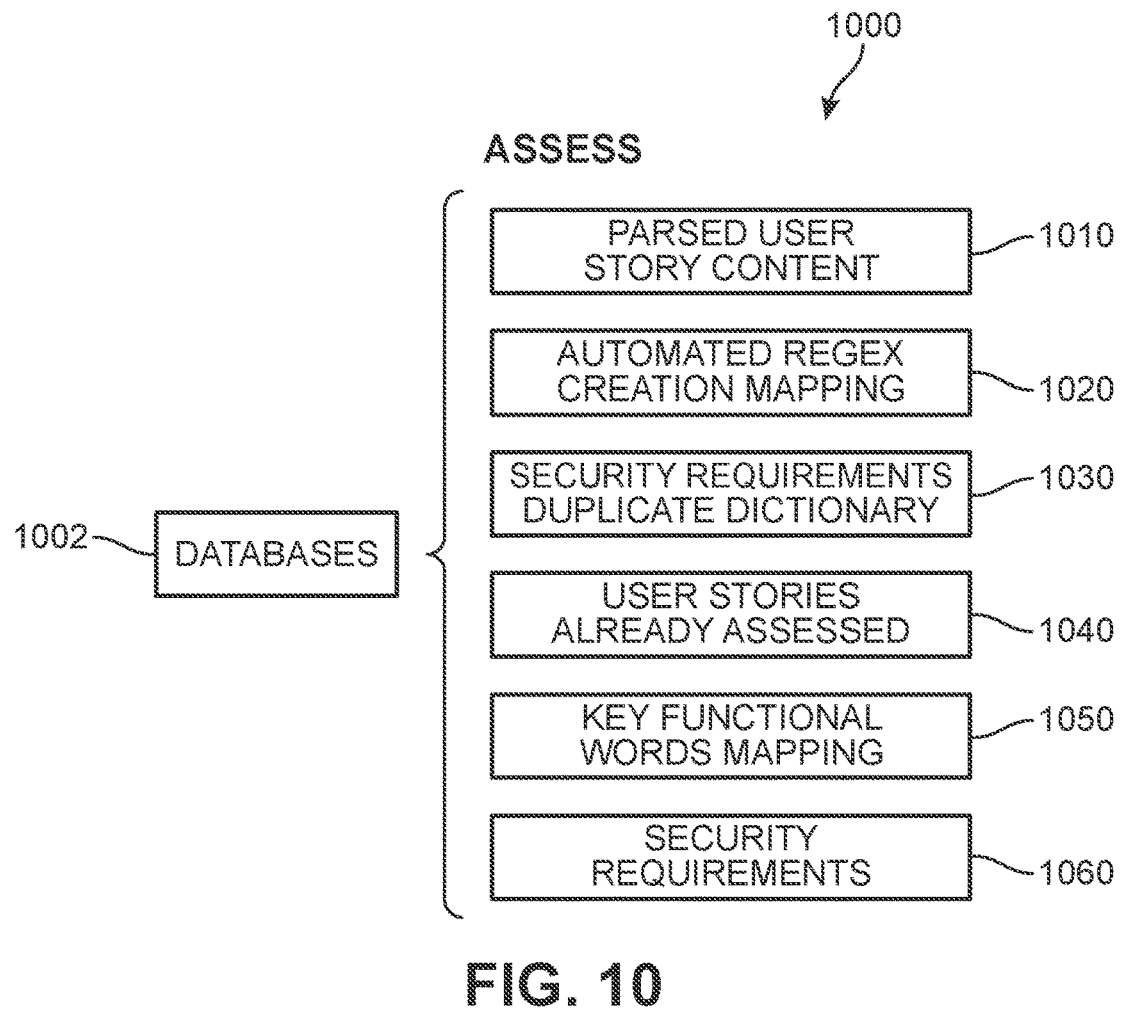
FIG. 10 is a schematic diagram presenting a process for assessing key functional words to identify security requirements, according to an embodiment.

For example, in FIG. 10, an assessment based on key functional words to determine security requirements process 1000 is represented. In this phase, the analysis engine (see FIG. 2) can rely on databases 1002, including (a) Parsed User Story Content 232, corresponding to the user story data parsed into an array list; (b) Automatic Regex Creation Mapping 234, which is based on the Key Functional Words Mapping database, such that a regex (regular expression, i.e., a sequence of characters that forms a search pattern) is automatically created for each functional word based on security engineer's input into "Key Functional Words Mapping" database, and where each functional word regex is mapped to a list of unique security requirements based on the "Key Functional Words Mapping" database; (c) Security Requirements Duplicate Dictionary 236 created based on the "User Stories Already Assessed Database, and uses a unique identifier from the user story and maps this to a list of security requirements already linked with the user story—if the security requirement is already mapped to the user story, it does not need to be mapped again, so the system can eliminate duplicate entries; (d) User Stories Already Assessed Database 260 containing each user story's unique identifier and the security requirements that have already been linked to it; (e) Key Functional Words Mapping 270, a database which maps a key functional word to security requirements using the security requirements database, in some cases by way of a one-to-many relationship with one functional word being associated with more than one security requirement, (f) Security Requirements Database 280 that store the security requirements for the application, and includes each security requirement's Unique Identifier, Title, Description of Risk, Impact to Organization, and Information on Mitigating/Preventing Risk, including secure code frameworks to utilize, and (g) Automated Testing Playbook Repository 290 storing custom code directed to each security requirement and functional area and configured to execute healing actions as appropriate in response to the identification of a particular security requirement and user story context.

In different embodiments, the analysis engine assesses each user story, as described earlier with reference to the diagram of FIG. 3. Thus, the assessment phase can involve a sequence of steps including (a) the analysis engine obtains the output from the "Parsed User Story Content" and goes through each word in each user story; (b) Using the dictionary from the "Automatic Regex Creation Mapping" output, each word is examined using regex to determine if a match is found; (c) If a match is found, the dictionary output from "Key Functional Words Mapping" is used to determine what security requirements are associated with the match; (d) Using the security requirements from the "Key Functional Words Mapping" output, these security requirements unique identifiers are then used as part of the "Security Requirements Duplicate Dictionary" to determine if the security requirements have already been linked to the user story; (e) If the security requirement cannot be found for the user story in the "User Stories Already Assessed Database" the user story is linked to the security requirement and this is updated in the "Security Requirements Duplicate Dictionary"; and (f) repeating the process with the examination of each word in each user story until all the user stories have been assessed and security requirements are linked with them.

In different embodiments, following the assessment phase, the system is configured to generate a report of security requirements mapped with the user stories. In one example, the report can be used for security metrics tracking, and furthermore, for creating security requirements in the user story database to link security requirements with user stories, as well as to provide input into the "User Stories Already Assessed" Database. In some embodiments, the report can list the security requirement and the user story that the security requirement is associated with in a single line. For example, the key components of the security requirement (e.g., Security Requirement Unique Identifier, Title) including all the details of the user story (e.g., User Story Unique Identifier) can be arranged on one line. In different embodiments, the report can include various types of information for describing each security requirement, such as the "issuekey" or "story identification number", "issueid", "featured", "abusecase #", "keyword", "abuse case registry number", "hacker use case", "CWE related to", "vulnerability impact", "recommendation", "references", "security team contact", "keywords", etc. In one example, all of these values for a single security requirement can be displayed on a single line (row). While the security requirements identification system is described as generating the report in CSV format for the sake of explanation, it will be understood that the security requirements identification system may generate reports in other spreadsheet and document or file formats. The security requirements identification system may also transmit a notification email or SMS message to one or more of the project team members.

In some embodiments, the system can also perform a check to identify any new security requirements have been added and retrieve data from the report to update its own databases. In one embodiment, the system can be configured to automatically communicate with the "Upload Processor", which can determine if there are new security requirements that need to be linked with user stories. For example, this check can correspond to a push to see if new security requirements are associated with a retrieval of the data. In response, the system can then push the 'new' data representing the security requirements to the user stories already assessed database, and include links to appropriate features or the User Story. In one example, new security requirements identified are pushed to the "Cleaning Processor" to ensure the data is in the right format to be uploaded. The new security requirements are then created and inserted into the "User Story Database".

As described herein, the security requirements identification system offers substantial advantages to project development paradigms. The security requirements identification system has shown to lead to a 99% percent reduction in manual assessment time through its automated analyzing engine for assessing security requirements, leading to more time for security resources to help in other areas of the organization.

In one example, processes beyond the development of the business user story (e.g., built by the business or product owners and located in a user story database) and the subsequent updates (e.g., by a security analyst) when the functional words are to be mapped to security requirements could be automatically executed as the system continuously reviews user stories and identifies new security requirements. In some embodiments, when a developer codes the user story, they can almost immediately view the associated security requirements, for example via a linking of the security requirement to a user story. In such cases, the same flow or process a developer uses to assess their user story when preparing to code can also represent the same process by which security requirements can be securely added.

In addition, the proposed security requirements identification system offers the ability to scale to hundreds of thousands of user stories across the business or organization and automatically create security requirements as part of the organization's SDLC. Developers are then able to build unit tests based on the security requirements that have been identified, increasing the time they can spend on writing code, instead of researching security risks, or filling out manual surveys associated with user bias.

Figure 11:
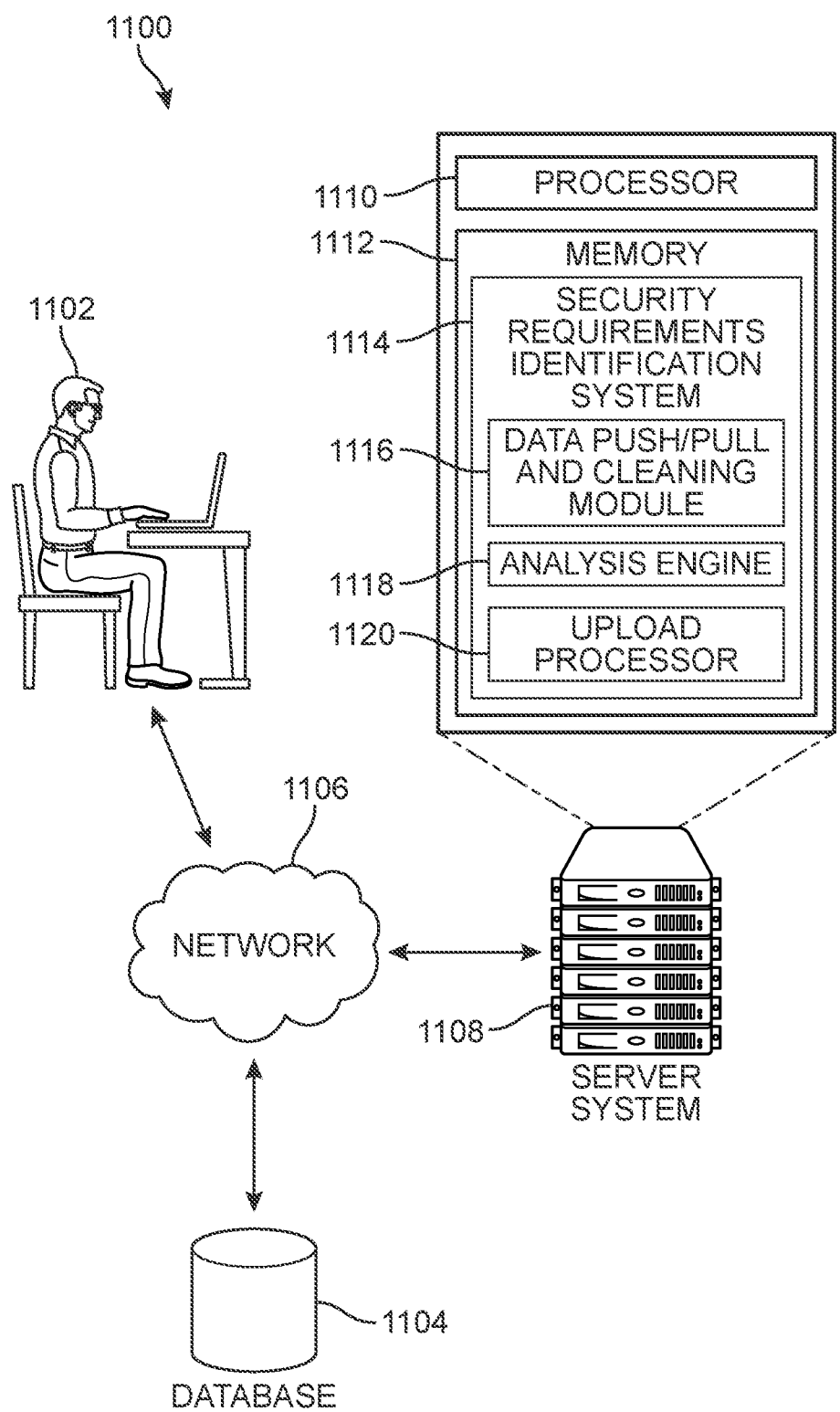
FIG. 11 is a diagram depicting example environments and components by which systems and/or methods, described herein, may be implemented.

FIG. 11 is a schematic diagram of an environment 1100 for a security requirements identification system (or system 1100), according to an embodiment. The environment 1100 may include a plurality of components capable of performing the disclosed methods. For example, environment 1100 includes a user device 1102, a computing/server system 1108, and a database 1104. The components of environment 1100 can communicate with each other through a network 1106. For example, user device 1102 may retrieve information from database 1104 via network 1106. In some embodiments, network 1106 may be a wide area network ("WAN"), e.g., the Internet. In other embodiments, network 1106 may be a local area network ("LAN").

As shown in FIG. 11, components of the system 1114 may be hosted in computing system 1108, which may have a memory 1112 and a processor 1110. Processor 1110 may include a single device processor located on a single device, or it may include multiple device processors located on one or more physical devices. Memory 1112 may include any type of storage, which may be physically located on one physical device, or on multiple physical devices. In some cases, computing system 1108 may comprise one or more servers that are used to host the system.

While FIG. 11 shows one user device, it is understood that one or more user devices may be used. For example, in some embodiments, the system may include two or three user devices. In some embodiments, the user device may be a computing device used by a user. For example, user device 1102 may include a smartphone or a tablet computer. In other examples, user device 1102 may include a laptop computer, a desktop computer, and/or another type of computing device. The user devices may be used for inputting, processing, and displaying information. Referring to FIG. 11, environment 1100 may further include database 1104, which stores test data, training data, and/or other related data the security requirements identification system as well as other external components. This data may be retrieved by other components for system 1114. As discussed above, system 1114 may include a data push/pull and cleaning module 1116, an analysis engine 1118, and an upload processor 1120. Each of these components may be used to perform the operations described herein.

Figure 12:
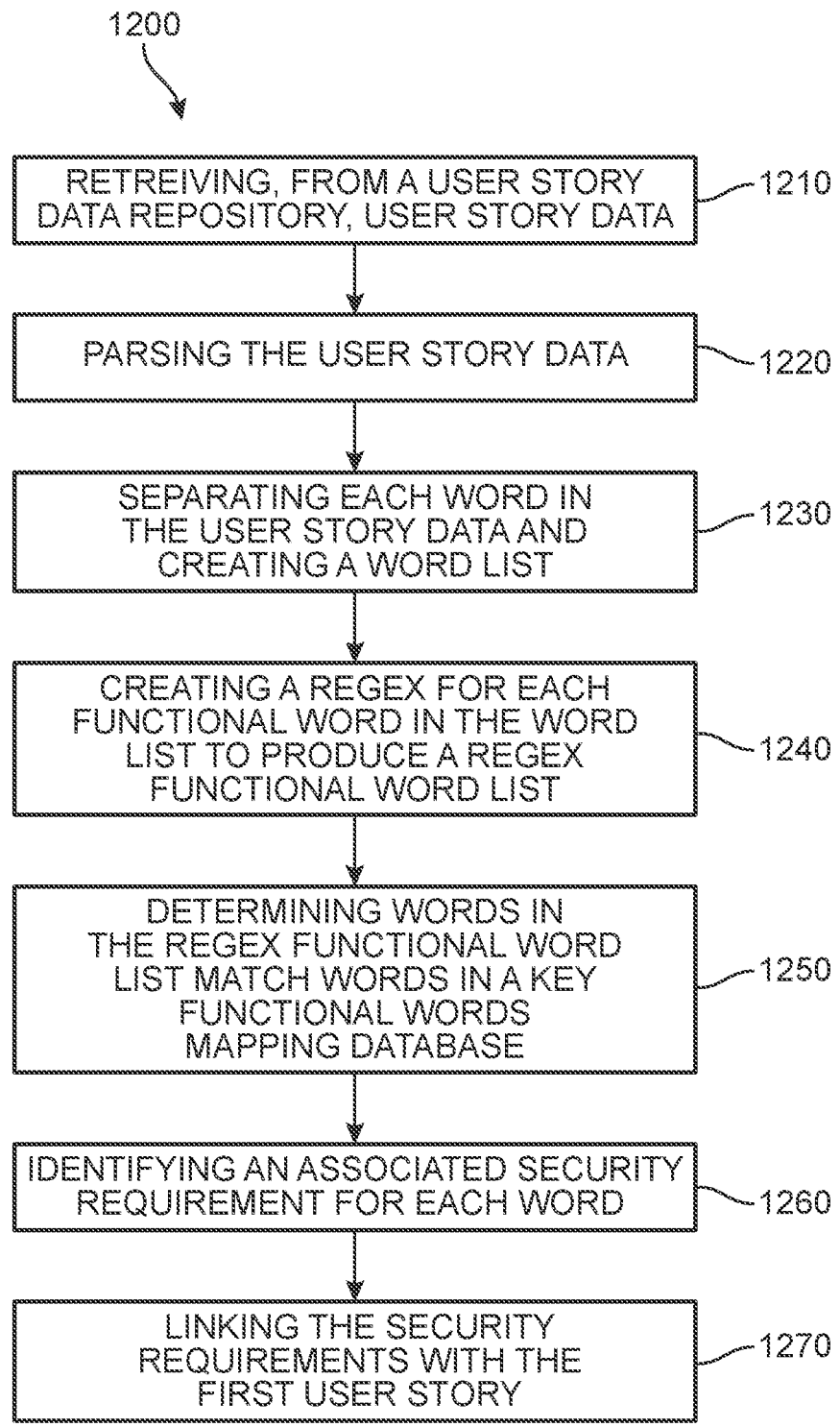
FIG. 12 is a flow chart depicting a method for identifying security requirements during project development, according to an embodiment.

FIG. 12 is a flow chart illustrating an embodiment of a method 1200 of for identification of security requirements during a project development lifecycle. As shown in FIG. 12, a first step 1210 of the method 1200 includes retrieving, from a user story data repository and at a first time, user story data for a first user story, and a second step 1220 of separating each individual word in the user story data (also referred to as parsing the user story data) to create a first word list. A third step 1230 includes identifying, using NLP, whether each individual word in the first word list is a functional word, and a fourth step 1240 includes creating a regex for each individual word identified in the first word list as a functional word to produce a first regex list comprising a first plurality of functional word regexes. The method 1200 also includes a fifth step 1250 of determining which functional word regexes in the first functional word regex list have one or more corresponding security requirements in a key functional words mapping database, and a sixth step 1260 of forming the one or more corresponding security requirements into a first list of security requirements. Furthermore, a seventh step 1270 includes linking at least a first security requirement of the first list of security requirements with the first user story in the user stories already assessed database, and an eighth step 1280 includes automatically generating and displaying a first report that identifies the first security requirement together with the first user story.

In other embodiments, the method may include additional steps or aspects. In another example, the method 1200 further includes step of, in response to linking at least the first security requirement of the first list of security requirements with the first user story in the user stories already assessed database, mapping the first security requirement to the first user story in a security requirements duplicate dictionary. The method many further include determining a second functional word regex of the first functional word regex list is associated with the second security requirement in the key functional words mapping database. The method many further include determining that the second security requirement is already mapped to the first user story in the security requirements duplicate dictionary. In some embodiments, the method may include comparing second security requirement with security requirements identified in a security requirements duplicate dictionary for the first user story to determine whether the second security requirement is already mapped to the first user story.

The method may further include, in response to determining that the second security requirement is already mapped to the first user story in the security requirements duplicate dictionary, refraining from mapping the second security requirement to the first user story a second time in the user stories already assessed database or the security requirements duplicate dictionary. The method may further include, in response to determining that the second security requirement is already mapped to the first user story in the security requirements duplicate dictionary, removing any duplicates of the second security requirement from the first report. The method may further include, in response to determining that the second security requirement is already mapped to the first user story in the security requirements duplicate dictionary, eliminating any duplicate entries of linking together the second security requirement with the first user story in the security requirements duplicate dictionary.

The method may further include, in response to determining that the second security requirement is not mapped to the first user story in the security requirements duplicate dictionary, mapping the second security requirement to the first user story in the user stories already assessed database and updating the security requirements duplicate dictionary.

In another example, the method 1200 further includes steps of determining a first functional word regex of the first functional word regex list is associated with a second security requirement, comparing the second security requirement with security requirements identified in a security requirements duplicate dictionary for the first user story, determining the second security requirement differs from the security requirements identified in the security requirements duplicate dictionary, and linking, in response to the second security requirement differing, the second security requirement to the first user story (in other words, only permitting the association/link to be created when the security requirement is unique with respect to the security requirements duplicate dictionary).

In some embodiments, the method also includes steps of determining a first functional word regex of the first functional word regex list is associated with a second security requirement, comparing the second security requirement with security requirements identified in a security requirements duplicate dictionary for the first user story, the security requirements duplicate dictionary listing at least a third security requirement, determining the second security requirement matches the third security requirement, and precluding, in response to the second security requirement matching the third security requirement, the second security requirement from being linked to the first user story more than once in the first report.

In some embodiments, the method also includes steps automatically inputting, in response to generating the first report, the first report into a user stories already assessed database, wherein a security requirements duplicate dictionary is based on data stored in the user stories already assessed database. The method may include retrieving, from the user story data repository and at a second time subsequent to the first time, updated user story data for the first user story. The method may include separating each individual word in the updated user story data to create a second word list. The method may include identifying, using NLP, whether each individual word in the second word list is a functional word. The method may include creating a regex for each individual word identified in the second word list as a functional word to produce a second functional word regex list comprising a second plurality of functional word regexes. The method may include determining that a first functional word regex in the second functional word regex list corresponds to a second security requirement in the key functional words mapping database. The method may include automatically referring to the security requirements duplicate dictionary to determine whether the second security requirement had been previously linked to the first user story. The method may include, in response to determining that the first security requirement had not been previously linked to the first user story, automatically generating and displaying a second report that identifies the second security requirement together with the first user story.

In some embodiments, the method also includes steps automatically inputting, in response to generating the first report, the first report into a user stories already assessed database, wherein a security requirements duplicate dictionary is based on data stored in the user stories already assessed database. The method may include retrieving, from the user story data repository and at a second time subsequent to the first time, updated user story data for the first user story. The method may include separating each individual word in the updated user story data to create a second word list. The method may include identifying, using NLP, whether each individual word in the second word list is a functional word. The method may include creating a regex for each individual word identified in the second word list as a functional word to produce a second functional word regex list comprising a second plurality of functional word regexes. The method may include determining that a first functional word regex in the second functional word regex list corresponds to a second security requirement in the key functional words mapping database. The method may include automatically referring to the security requirements duplicate dictionary to determine whether the second security requirement had been previously linked to the first user story. The method may include, in response to determining that the first security requirement had been previously linked to the first user story, automatically generating and displaying a second report that identifies the second security requirement together with the first user story only once.

In some embodiments, the key functional words mapping database provides information mapping each key functional word to one or more security requirements. In one example, separating each word is based on detection of one or more of a white space character, special character, and punctuation marks. In some embodiments, the method also includes parsing the user story data to identify a plurality of user story components, where the first report is generated as a CSV file, each security requirement is assigned one line in the first report, and the user story components for the user story linked with said security requirement are included in the same line.

In some other embodiments, the method 1200 further includes steps of retrieving, from an automated testing playbook repository, a first automated testing playbook associated with the first security requirement, automatically performing a first test based on the first automated testing playbook, and automatically generating and displaying a second report that identifies results of the first test. In such cases, the method can also include steps of identifying, during the first test, a first issue, and then automatically executing, based on a plurality of healing actions included in the first automated testing playbook, a first healing action to resolve the first issue.

In another example, the method 1200 also includes steps of automatically inputting, in response to generating the first report, the first report into a user stories already assessed database, where a security requirements duplicate dictionary is based on data stored in the user stories already assessed database, retrieving, from the user story data repository and at a second time subsequent to the first time, updated user story data for the first user story, separating each individual word in the updated user story data to create a second word list, identifying, using NLP, whether each individual word in the second word list is a functional word, creating a regex for each individual word identified in the second word list as a functional word to produce a second functional word regex list comprising a second plurality of functional word regexes, determining that a first functional word regex in the second functional word regex list corresponds to a second security requirement in the key functional words mapping database, automatically referring to the security requirements duplicate dictionary to determine whether the second security requirement had been previously linked to the first user story, and, in response to determining that the first security requirement had not been previously linked to the first user story, automatically generating and displaying a second report that identifies the second security requirement together with the first user story. In some embodiments, automatically referring to the security requirements duplicate dictionary to determine whether the second security requirement had been previously linked to the first user story may include comparing the second security requirement to the security requirements already linked to the first user story in the security requirements duplicate dictionary. In some embodiments, the updated user data for the first user story may include updates made to the first user story as it is groomed over time.

As described herein, embodiments of the security requirements identification system are configured to automatically and with a high degree of accuracy identify security risks as early as possible during project development. Early identification of security requirements—before a developer even starts writing code—is favorable for securing code frameworks. As user story data is received, typically in a 'rough', chunky, and/or unstructured or random format, such as shellcode. Thus, the system is configured to first clean the received data before detecting and extracting functional keywords, where each user story can be shown on one line (row) in an array. This can occur by the removal of special characters and punctuation marks, and replacement with white spaces. Each word, separated, can be evaluated to see if it matches data in the key functional words mapping database. After each word in the user story is processed, the system can move to the next line down to process and identify security requirements for the next user story. In one example, the key functional words mapping database receives the separated words and creates regex statements of each word, and then analyzes the statement relative to its own database. In the case of a match, the system can cause the security requirements mapped to that functional word to be linked with the user story.

Each security story can represent one keyword (e.g., return URL, API, etc.) that is mapped to one or more related security requirements in the key functional words/groups mapping database that holds the entire mapping and can be configured to grow as the system identifies further security issues. The system works in conjunction with a security client database which is based on a security requirement database and has a unique identifier with a bridge for each security requirement.

Furthermore, the inclusion of a user stories already assessed database can enable the system to avoid duplication of security requirements that have already been flagged and presented to the developers, thereby limiting the 'noise' that the developer is asked to attend to. Thus, if there are duplicates for a security requirement or it has otherwise already been called out for that user story, the security requirement will not be added to the list, ensuring each security requirement only shows up once. If there is a new security story, it can be added to the dictionary for that user story. If the user story is modified and is reprocessed by the security identification system, the system can determine that the story has been analyzed before, and whether the key functional words would trigger the same security requirements as during the previous process. If the security requirements are the same as before, they are excluded or will not be added. If the security requirements differ from the ones identified previously, they are added. The report that is generated for the modified or updated user story can only identify the new security requirements, rather than re-list the entire set of security requirements.

To provide further context, in some embodiments, some of the processes described herein can be understood to operate in a system architecture that can include a plurality of virtual local area network (VLAN) workstations at different locations that communicate with a main data center with dedicated virtual servers such as a web server for user interfaces, an app server for OCR and data processing, a database for data storage, etc. As a general matter, a virtual server is a type of virtual machine (VM) that is executed on a hardware component (e.g., server). In some examples, multiple VMs can be deployed on one or more servers.

In different embodiments, the system may be hosted at least in part in a cloud computing environment offering ready scalability and security. The cloud computing environment can include, for example, an environment that hosts the document processing management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource"). It is contemplated that implementations of the present disclosure can be realized with appropriate cloud providers (e.g., AWS provided by Amazon™, GCP provided by Google™, Azure provided by Microsoft™, etc.).

In different embodiments, applications of the system are built and deployed by a software framework. A software framework is a universal, reusable software environment that provides particular functionality as part of a larger software platform to facilitate development of software applications. Software frameworks may include support programs, compilers, code libraries, tool sets, and application programming interfaces (APIs) that enable development of a software application. Some implementations can provide a user device and/or component management platform that is capable of facilitating the development of software applications through the use of a user interface designed to be simple to use, and re-usable software components (e.g., buttons, links, fields, graphics, and/or the like) that can be displayed in the user interface and generated in multiple different software frameworks and/or programming languages for a variety of platforms. For example, the component management platform may provide a first software application that includes a user interface through which a user can develop a second software application. The user may use features of the user interface to create software components that are displayed in the first software application (e.g., the UI) using a first programming language (e.g., hypertext markup language (HTML) or another programming language associated with the first software application) and generated in a first software framework (e.g., a software framework associated with the software application being developed). The user interface may include features, such as drag and drop operations for the creation of software components and selectable software component characteristics, to facilitate creation and customization of software components. In some implementations, the component management platform may store components that were previously generated by users, generate copies of software components in multiple software frameworks and/or for different platforms, and make software components available for users to include in software applications that are under development.

In this way, a user device and/or cloud server may facilitate the development of software applications in multiple software frameworks and for multiple platforms, without requiring special knowledge or repeated component development on the part of a user, and in a manner designed to be relatively quick and efficient. Special software framework knowledge and/or familiarity may not be required, for example, by using a user interface to enable the generation of software components in multiple software frameworks in a single integrated development environment, such as a web-based integrated development environment that is accessible from any device with a web browsing application browser. Some non-limiting examples of such frameworks include Microsoft.NET™, the EMC™ integrated development environment, the Microsoft™ Visual Studios integrated development environment for writing and debugging code, and the Eclipse™ integrated development environment for incorporation of open source code. Reusable software components may significantly increase the speed and efficiency of software development, including facilitating more efficient use of software developer time and computing resources (e.g., processor resources, memory resources, and/or the like). Some implementations may reduce network communications relative to a purely cloud-based application development solution, e.g., by enabling the user device to perform much of the functionality for component and software application development without the need to interact with a server computer over a network, which would introduce latency into the development process. Furthermore, some implementations described herein use a rigorous, computerized process to perform tasks or roles that were not previously performed. Also, automating the process for generating software components conserves computing resources (e.g., processor resources, memory resources, and/or the like) and time that would otherwise be wasted by using manual development processes for attempting to create multiple software components in multiple software frameworks.

In some embodiments, the software development application may be an application installed on and executed by the user device. In some implementations, the software development application may be a web-based application designed to execute a web application (e.g., an application operating on a server computer or the component management platform, and implemented in HTML, JavaScript, and/or the like). The software development application may be written in a variety of programming languages and provide a variety of different types of user interface elements, which may be used in the development of a new software component and/or another software application. In some embodiments, the software development application includes a component toolbox. The component toolbox may be presented via a user interface offering one or more interactable user interface elements, such as buttons, which are associated with software components. For example, the component toolbox may include one or more buttons for the generation of software components, such as input components (e.g., buttons, checkboxes, dropdown lists, toggle buttons, text fields, and/or the like), navigational components (e.g., search fields, sliders, pagination indicators, links, icons, and/or the like), informational components (e.g., tooltips, progress bars, message boxes, images, and/or the like), and/or the like. In some implementations, the component toolbox may include user interface elements that generate a software component based on a pre-existing software component (e.g., a previously created software component). In some implementations, the component toolbox may include a user interface element designed to enable the creation of a new software component, which may enable a user of the user device to define a new type of software component.

For purposes of this disclosure, the Application Programming Interfaces (APIs) may refer to computer code that supports application access to operating system functionality. A platform dependent API may be understood to rely on the functionality of a particular software platform. The platform dependent API may use device specific libraries or native code allowing access to the mobile device at a low level. The API can be configured to provide a wide range of visualization dashboards for document processing management, as will be discussed below.

It should be understood that the systems and/or methods as described herein may be implemented using different computing systems, components, modules, and connections. An end-user or administrator may access various interfaces provided or supported by the policy management service, for example, via one or more devices capable of receiving, generating, storing, processing, and/or providing information, such as information described herein. For example, a user device may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device may receive information from and/or transmit information to the policy management service platform. For example, a device may include a bus, a processor, a memory, a storage device, an input component, an output component, and a communication interface.

Embodiments may include a non-transitory computer-readable medium (CRM) storing software comprising instructions executable by one or more computers which, upon such execution, cause the one or more computers to perform the disclosed methods. Non-transitory CRM may refer to a CRM that stores data for short periods or in the presence of power such as a memory device or Random Access Memory (RAM). For example, a non-transitory computer-readable medium may include storage devices, such as, a hard disk (e.g., a magnetic disk, an optical disk, a magneto-optic disk, and/or a solid state disk), a compact disc (CD), a digital versatile disc (DVD), a floppy disk, a cartridge, and/or a magnetic tape.

Embodiments may also include one or more computers and one or more storage devices storing instructions that are operable, when executed by the one or more computers, to cause the one or more computers to perform the disclosed methods.

Furthermore, an input component includes a component that permits the device to receive information, such as via user input (e.g., a touch screen display, a keyboard, a keypad, a mouse, a button, a switch, and/or a microphone). Additionally, or alternatively, input components may include a sensor for sensing information (e.g., a global positioning system (GPS) component, an accelerometer, a gyroscope, and/or an actuator). The output component includes a component that provides output information from a device (e.g., a display, a speaker, and/or one or more light-emitting diodes (LEDs)).

A communication interface includes a transceiver-like component (e.g., a transceiver and/or a separate receiver and transmitter) that enables a device to communicate with other devices, such as via a wired connection, a wireless connection, or a combination of wired and wireless connections. The communication interface may permit the device to receive information from another device and/or provide information to another device. For example, a communication interface may include an Ethernet interface, an optical interface, a coaxial interface, an infrared interface, a radio frequency (RF) interface, a universal serial bus (USB) interface, a Wi-Fi interface, a cellular network interface, and/or the like.

Software instructions may be read into memory and/or storage devices from another computer-readable medium or from another device via communication interface. When executed, software instructions stored in memory and/or storage device may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

In some implementations, a policy management service may be hosted in a cloud computing environment. Notably, while implementations described herein describe a policy management service as being hosted in cloud computing environment, in some implementations, a policy management service may not be cloud-based (i.e., may be implemented outside of a cloud computing environment) or may be partially cloud-based.

Cloud computing environment can include, for example, an environment that hosts the policy management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource").

Computing resources includes one or more personal computers, workstation computers, server devices, or other types of computation and/or communication devices. In some implementations, computing resources may host the policy management service. The cloud resources may include compute instances executing in computing resource, storage devices provided in computing resource, data transfer devices provided by computing resource, etc. In some implementations, computing resource may communicate with other computing resources via wired connections, wireless connections, or a combination of wired and wireless connections. In some embodiments, a computing resource includes a group of cloud resources, such as one or more applications ("APPs"), one or more virtual machines ("VMs"), virtualized storage ("VSs"), one or more hypervisors ("HYPs"), and/or the like.

Application includes one or more software applications that may be provided to or accessed by user devices. Application may eliminate a need to install and execute the software applications on a user device. For example, an application may include software associated with the policy management service and/or any other software capable of being provided via a cloud computing environment, while in some embodiments, other applications are provided via virtual machines. A virtual machine can include a software implementation of a machine (e.g., a computer) that executes programs like a physical machine. A virtual machine may be either a system virtual machine or a process virtual machine, depending upon use and degree of correspondence to any real machine by virtual machine. A system virtual machine may provide a complete system platform that supports execution of a complete operating system ("OS"). A process virtual machine may execute a single program, and may support a single process. In some embodiments, virtual machines may execute on behalf of a user (e.g., a user of user device or an administrator of the policy management service), and may manage infrastructure of cloud computing environment, such as data management, synchronization, or long-duration data transfers.

Virtualized storage includes one or more storage systems and/or one or more devices that use virtualization techniques within the storage systems or devices of computing resources. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisors may provide hardware virtualization techniques that allow multiple operating systems (e.g., "guest operating systems") to execute concurrently on a host computer, such as a computing resource. Hypervisors may present a virtual operating platform to the guest operating systems, and may manage the execution of the guest operating systems. Multiple instances of a variety of operating systems may share virtualized hardware resources.

A network includes one or more wired and/or wireless networks. For example, networks may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

An "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a user interface, or other such information presentation.

In addition to the algorithms and techniques described above, one or more of the following techniques may be utilized by one or more of the disclosed embodiments: RPA, Mongo DB, Artificial Intelligence (AI) Modules such as Python, Image to Text, OCR, Computer Vision, Image comparison (phase comparison), Image Validation (image to text, then text to text comparison), Learning Algorithms, Similarity Analytics, Sequencing algorithms, Random Forest, graph Convolutional Neural Networks (gCNN), Data Clustering with weighted data, Data Visualization, Rocket Chat, and D3JS.

For purposes of the current description, the terms "organization," "client," "organization resources," or "client resources" refer to database resources (i.e., data, metadata, programs, and other resources) that are maintained in a central multi-tenant database for access by users who have appropriate access privileges. Such resources can generally be managed by a server and data storage system maintained by a platform provider, as opposed to computers within the actual client (tenant) businesses themselves. In addition, a Cloud Service Provider (CSP) may include an organization that provides a cloud computing resource to a client device and/or a user of a client device. Furthermore, the term "component" refers to software applications and other system modules and features comprising or supporting the multi-tenant architecture.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways.

Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for identification of security requirements, the method comprising:

retrieving, from a user story data repository and at a first time, user story data for a first user story;

separating each individual word in the user story data to create a first word list;

identifying, using natural language processing, whether each individual word in the first word list is a functional word;

creating a regular expression (regex) for each individual word identified in the first word list as the functional word to produce a first functional word regex list comprising a first plurality of functional word regexes;

determining which functional word regexes in the first functional word regex list have one or more corresponding security requirements in a key functional words mapping database, wherein the one or more corresponding security requirements indicate requirements of security to protect assets associated with the user story data from internet attacks to the assets;

forming the one or more corresponding security requirements into a first list of security requirements;

linking at least a first security requirement of the first list of security requirements with the first user story in a user stories already assessed database; and automatically generating and displaying a first report that identifies the first security requirement together with the first user story.

2. The method of claim 1, further comprising:

in response to linking at least the first security requirement of the first list of security requirements with the first user story in the user stories already assessed database, mapping the first security requirement to the first user story in a security requirements duplicate dictionary;

determining a second functional word regex of the first functional word regex list is associated with a second security requirement in the key functional words mapping database;

determining that the second security requirement is already mapped to the first user story in the security requirements duplicate dictionary; and in response to determining that the second security requirement is already mapped to the first user story in the security requirements duplicate dictionary, refraining from mapping the second security requirement to the first user story a second time.

3. The method of claim 1, further comprising:

in response to linking at least the first security requirement of the first list of security requirements with the first user story in the user stories already assessed database, mapping the first security requirement to the first user story in a security requirements duplicate dictionary;

determining a second functional word regex of the first functional word regex list is associated with a second security requirement in the key functional words mapping database;

determining that the second security requirement is not mapped to the first user story in the security requirements duplicate dictionary; and in response to determining that the second security requirement is not mapped to the first user story in the security requirements duplicate dictionary, mapping the second security requirement to the first user story in the user stories already assessed database and updating the security requirements duplicate dictionary.

4. The method of claim 1, further comprising:

automatically inputting, in response to generating the first report, the first report into the user stories already assessed database, wherein a security requirements duplicate dictionary is based on data stored in the user stories already assessed database;

retrieving, from the user story data repository and at a second time subsequent to the first time, updated user story data for the first user story;

separating each individual word in the updated user story data to create a second word list;

identifying, using natural language processing, whether each individual word in the second word list is the functional word;

creating a regex for each individual word identified in the second word list as the functional word to produce a second functional word regex list comprising a second plurality of functional word regexes;

determining that a first functional word regex in the second functional word regex list corresponds to a second security requirement in the key functional words mapping database;

automatically referring to the security requirements duplicate dictionary to determine whether the second security requirement had been previously linked to the first user story; and in response to determining that the first security requirement had not been previously linked to the first user story, automatically generating and displaying a second report that identifies the second security requirement together with the first user story.

5. The method of claim 1, further comprising:

automatically inputting, in response to generating the first report, the first report into a user stories already assessed database, wherein a security requirements duplicate dictionary is based on data stored in the user stories already assessed database;

retrieving, from the user story data repository and at a second time subsequent to the first time, updated user story data for the first user story;

separating each individual word in the updated user story data to create a second word list;

identifying, using natural language processing, whether each individual word in the second word list is the functional word;

creating a regex for each individual word identified in the second word list as the functional word to produce a second functional word regex list comprising a second plurality of functional word regexes;

determining that a first functional word regex in the second functional word regex list corresponds to a second security requirement in the key functional words mapping database;

automatically referring to the security requirements duplicate dictionary to determine whether the second security requirement had been previously linked to the first user story; and in response to determining that the first security requirement had not been previously linked to the first user story, automatically generating and displaying a second report that identifies the second security requirement together with the first user story only once.

6. The method of claim 1, further comprising:
retrieving, from an automated testing playbook repository, a first automated testing playbook associated with the first security requirement;
automatically performing a first test based on the first automated testing playbook; and
automatically generating and displaying a second report that identifies results of the first test.

7. The method of claim 6, further comprising:
identifying, during the first test, a first issue; and
automatically executing, based on a plurality of healing actions included in the first automated testing playbook, a first healing action to resolve the first issue.

8. A non-transitory computer-readable medium storing software comprising instructions executable by one or more computers which, upon such execution, cause the one or more computers to:
retrieve, from a user story data repository and at a first time, user story data for a first user story;
separate each individual word in the user story data to create a first word list;
identify, using natural language processing, whether each individual word in the first word list is a functional word;
create a regular expression (regex) for each individual word identified in the first word list as the functional word to produce a first functional word regex list comprising a first plurality of functional word regexes;
determine which functional word regexes in the first functional word regex list have one or more corresponding security requirements in a key functional words mapping database, wherein the one or more corresponding security requirements indicate requirements of security to protect assets associated with the user story data from internet attacks to the assets;
form the one or more corresponding security requirements into a first list of security requirements;
link at least a first security requirement of the first list of security requirements with the first user story in a user stories already assessed database; and
automatically generate and display a first report that identifies the first security requirement together with the first user story.

9. The non-transitory computer-readable medium storing software of claim 8, wherein the instructions further cause the one or more computers to:
in response to linking at least the first security requirement of the first list of security requirements with the first user story in the user stories already assessed database, map the first security requirement to the first user story in a security requirements duplicate dictionary;
determine a second functional word regex of the first functional word regex list is associated with a second security requirement in the key functional words mapping database;
determine that the second security requirement is already mapped to the first user story in the security requirements duplicate dictionary; and
in response to determining that the second security requirement is already mapped to the first user story in the security requirements duplicate dictionary, refrain from mapping the second security requirement to the first user story a second time.

10. The non-transitory computer-readable medium storing software of claim 8, wherein the instructions further cause the one or more computers to:
in response to linking at least the first security requirement of the first list of security requirements with the first user story in the user stories already assessed database, map the first security requirement to the first user story in a security requirements duplicate dictionary;
determine a second functional word regex of the first functional word regex list is associated with a second security requirement in the key functional words mapping database;
determine that the second security requirement is not mapped to the first user story in the security requirements duplicate dictionary; and
in response to determining that the second security requirement is not mapped to the first user story in the security requirements duplicate dictionary, map the second security requirement to the first user story in the user stories already assessed database and updating the security requirements duplicate dictionary.

11. The non-transitory computer-readable medium storing software of claim 8, wherein the instructions further cause the one or more computers to:
automatically input, in response to generating the first report, the first report into the user stories already assessed database, wherein a security requirements duplicate dictionary is based on data stored in the user stories already assessed database;
retrieve, from the user story data repository and at a second time subsequent to the first time, updated user story data for the first user story;
separate each individual word in the updated user story data to create a second word list;
identify, using natural language processing, whether each individual word in the second word list is the functional word;
create a regex for each individual word identified in the second word list as the functional word to produce a second functional word regex list comprising a second plurality of functional word regexes;
determine that a first functional word regex in the second functional word regex list corresponds to a second security requirement in the key functional words mapping database;
automatically refer to the security requirements duplicate dictionary to determine whether the second security requirement had been previously linked to the first user story; and
in response to determining that the first security requirement had not been previously linked to the first user story, automatically generate and display a second report that identifies the second security requirement together with the first user story.

12. The non-transitory computer-readable medium storing software of claim 8, wherein the instructions further cause the one or more computers to:
automatically input, in response to generating the first report, the first report into a user stories already assessed database, wherein a security requirements duplicate dictionary is based on data stored in the user stories already assessed database;
retrieve, from the user story data repository and at a second time subsequent to the first time, updated user story data for the first user story;
separate each individual word in the updated user story data to create a second word list;

identify, using natural language processing, whether each individual word in the second word list is the functional word;

create a regex for each individual word identified in the second word list as the functional word to produce a second functional word regex list comprising a second plurality of functional word regexes;

determine that a first functional word regex in the second functional word regex list corresponds to a second security requirement in the key functional words mapping database;

automatically refer to the security requirements duplicate dictionary to determine whether the second security requirement had been previously linked to the first user story; and in response to determining that the first security requirement had been previously linked to the first user story, automatically generate and display a second report that identifies the second security requirement together with the first user story only once.

13. The non-transitory computer-readable medium storing software of claim 8, wherein the instructions further cause the one or more computers to:

retrieve, from an automated testing playbook repository, a first automated testing playbook associated with the first security requirement;

automatically perform a first test based on the first automated testing playbook; and automatically generate and display a second report that identifies results of the first test.

14. The non-transitory computer-readable medium storing software of claim 13, wherein the instructions further cause the one or more computers to:

identify, during the first test, a first issue; and automatically execute, based on a plurality of healing actions included in the first automated testing playbook, a first healing action to resolve the first issue.

15. A system for identification of security requirements, the system comprising one or more computers and one or more storage devices storing instructions that are operable, when executed by the one or more computers, to cause the one or more computers to:

retrieve, from a user story data repository and at a first time, user story data for a first user story;

separate each individual word in the user story data to create a first word list;

identify, using natural language processing, whether each individual word in the first word list is a functional word;

create a regular expression (regex) for each individual word identified in the first word list as the functional word to produce a first functional word regex list comprising a first plurality of functional word regexes;

determine which functional word regexes in the first functional word regex list have one or more corresponding security requirements in a key functional words mapping database, wherein the one or more corresponding security requirements indicate requirements of security to protect assets associated with the user story data from internet attacks to the assets;

form the one or more corresponding security requirements into a first list of security requirements;

link at least a first security requirement of the first list of security requirements with the first user story in a user stories already assessed database; and automatically generate and display a first report that identifies the first security requirement together with the first user story.

16. The system of claim 15, wherein the instructions further cause the one or more computers to:

in response to linking at least the first security requirement of the first list of security requirements with the first user story in the user stories already assessed database, map the first security requirement to the first user story in a security requirements duplicate dictionary;

determine a second functional word regex of the first functional word regex list is associated with a second security requirement in the key functional words mapping database;

determine that the second security requirement is already mapped to the first user story in the security requirements duplicate dictionary; and in response to determining that the second security requirement is already mapped to the first user story in the security requirements duplicate dictionary, refrain from mapping the second security requirement to the first user story a second time.

17. The system of claim 15, wherein the instructions further cause the one or more computers to:

in response to linking at least the first security requirement of the first list of security requirements with the first user story in the user stories already assessed database, map the first security requirement to the first user story in a security requirements duplicate dictionary;

determine a second functional word regex of the first functional word regex list is associated with a second security requirement in the key functional words mapping database;

determine that the second security requirement is not mapped to the first user story in the security requirements duplicate dictionary; and in response to determining that the second security requirement is not mapped to the first user story in the security requirements duplicate dictionary, map the second security requirement to the first user story in the user stories already assessed database and updating the security requirements duplicate dictionary.

18. The system of claim 15, wherein the instructions further cause the one or more computers to:

automatically input, in response to generating the first report, the first report into the user stories already assessed database, wherein a security requirements duplicate dictionary is based on data stored in the user stories already assessed database;

retrieve, from the user story data repository and at a second time subsequent to the first time, updated user story data for the first user story;

separate each individual word in the updated user story data to create a second word list;

identify, using natural language processing, whether each individual word in the second word list is a functional word;

create a regex for each individual word identified in the second word list as the functional word to produce a second functional word regex list comprising a second plurality of functional word regexes;

determine that a first functional word regex in the second functional word regex list corresponds to a second security requirement in the key functional words mapping database;

automatically refer to the security requirements duplicate dictionary to determine whether the second security requirement had been previously linked to the first user story; and in response to determining that the first security requirement had not been previously linked to the first user story, automatically generate and display a second report that identifies the second security requirement together with the first user story.

19. The system of claim 15, wherein the instructions further cause the one or more computers to:

automatically input, in response to generating the first report, the first report into a user stories already assessed database, wherein a security requirements duplicate dictionary is based on data stored in the user stories already assessed database;

retrieve, from the user story data repository and at a second time subsequent to the first time, updated user story data for the first user story;

separate each individual word in the updated user story data to create a second word list;

identify, using natural language processing, whether each individual word in the second word list is the functional word;

create a regex for each individual word identified in the second word list as the functional word to produce a second functional word regex list comprising a second plurality of functional word regexes;

determine that a first functional word regex in the second functional word regex list corresponds to a second security requirement in the key functional words mapping database;

automatically refer to the security requirements duplicate dictionary to determine whether the second security requirement had been previously linked to the first user story; and in response to determining that the first security requirement had been previously linked to the first user story, automatically generate and display a second report that identifies the second security requirement together with the first user story only once.

20. The system of claim 15, wherein the instructions further cause the one or more computers to:

retrieve, from an automated testing playbook repository, a first automated testing playbook associated with the first security requirement;

automatically perform a first test based on the first automated testing playbook; and automatically generate and display a second report that identifies results of the first test.

\* \* \* \* \*